(12) United States Patent
Durak et al.

(10) Patent No.: US 12,355,869 B2
(45) Date of Patent: Jul. 8, 2025

(54) SYSTEM AND METHOD FOR QUANTUM KEY DISTRIBUTION WITH ENTANGLED PHOTON PAIRS

(71) Applicant: OZYEGIN UNIVERSITESI, Istanbul (TR)

(72) Inventors: Kadir Durak, Istanbul (TR); Melis Pahali, Istanbul (TR)

(73) Assignee: QUBITRIUM TEKNOLOJI SANAYI VE TICARET ANONIM SIRKETI, Istanbul (TR)

( * ) Notice: Subject to any disclaimer, the term of this patent is extended or adjusted under 35 U.S.C. 154(b) by 223 days.

(21) Appl. No.: 17/928,619

(22) PCT Filed: Jul. 8, 2020

(86) PCT No.: PCT/TR2020/050610
§ 371 (c)(1),
(2) Date: Nov. 30, 2022

(87) PCT Pub. No.: WO2022/010427
PCT Pub. Date: Jan. 13, 2022

(65) Prior Publication Data
US 2023/0198750 A1     Jun. 22, 2023

(51) Int. Cl.
*H04L 9/08*      (2006.01)
*H04B 10/70*      (2013.01)
*H04L 9/06*      (2006.01)

(52) U.S. Cl.
CPC ........... *H04L 9/0852* (2013.01); *H04B 10/70* (2013.01); *H04L 9/0662* (2013.01)

(58) Field of Classification Search
None
See application file for complete search history.

(56) References Cited

U.S. PATENT DOCUMENTS

| | | | |
|---|---|---|---|
| 7,822,342 B1 | 10/2010 | Roberts et al. | |
| 2005/0135620 A1* | 6/2005 | Kastella | H04L 9/12 380/256 |

(Continued)

FOREIGN PATENT DOCUMENTS

| | | | | |
|---|---|---|---|---|
| CN | 111130779 A | * | 5/2020 | ............. H04B 10/70 |
| JP | 2000286841 A | | 10/2000 | |
| JP | 2018037904 A | * | 3/2018 | |

OTHER PUBLICATIONS

Thomas Scheidl, Rupert Ursin, Alessandro Fedrizzi, Sven Ramelow, Xiao-Song Ma, Thomas Herbst, Robert Prevedel, Lothar Ratschbacher, Johannes Kofler, Thomas Jennewein; "Feasibility of 300km quantum key distribution with entangled states", 2009, IOP Publishing Ltd, vol. 11, pp. 1-14 (Year: 2009).*

(Continued)

*Primary Examiner* — Oleg Korsak
*Assistant Examiner* — Shadi H Kobrosli
(74) *Attorney, Agent, or Firm* — Bayramoglu Law Offices LLC

(57) ABSTRACT

A system and a method for entanglement-based quantum key distribution (QKD) are provided. The photons used for quantification of security and forming of the raw key can be reallocated, and wasted photons' information may be recycled. Accordingly, a system for quantum key distribution including a photon source configured to generate entangled photon pair including first and second photons and two receiving units configured to receive separately the first and second photons is provided.

5 Claims, 1 Drawing Sheet

(56) References Cited

U.S. PATENT DOCUMENTS

2013/0315395 A1* 11/2013 Jacobs ................. H04L 9/0852
380/278
2018/0241553 A1* 8/2018 Lucamarini ........... H04L 9/0858
2020/0084033 A1 3/2020 Lamas-Linares et al.

OTHER PUBLICATIONS

Anton Zeilinger "Light for the quantum. Entangled photons and their applications: a very personal perspective", 2017, The Royal Swedish Academy of Sciences, pp. 1-34 (Year: 2017).*

Alexander Ling, et al., Experimental quantum key distribution based on a Bell test, Physical Review A, 2008, pp. 020301-1-020301-4, vol. 78, No. 2.

Edo Waks, et al., Security of quantum key distribution with entangled photons against individual attacks, Physical Review A, 2002, pp. 052310-1-052310-16, vol. 65, No. 5.

* cited by examiner

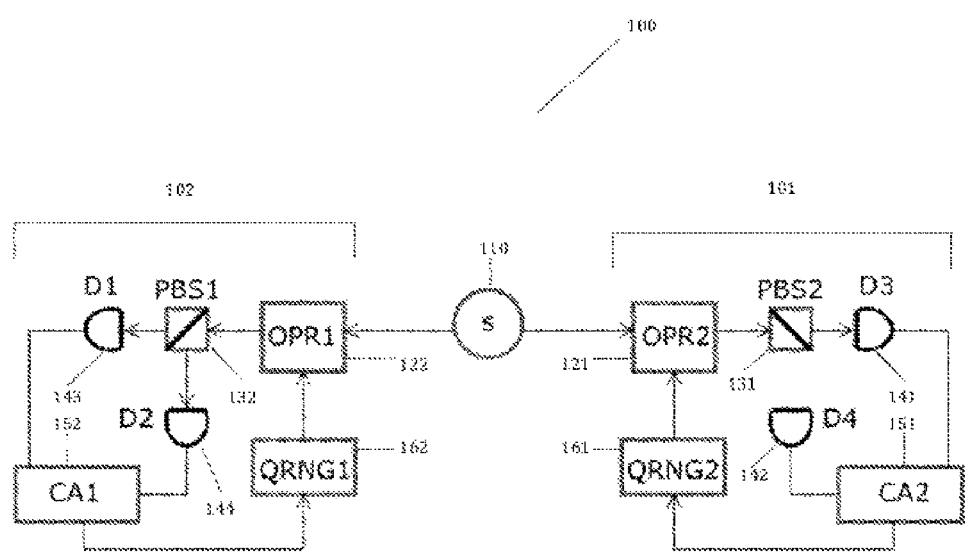

SYSTEM AND METHOD FOR QUANTUM KEY DISTRIBUTION WITH ENTANGLED PHOTON PAIRS

CROSS REFERENCE TO THE RELATED APPLICATIONS

This application is the national phase entry of International Application No. PCT/TR2020/050610 filed on Jul. 8, 2020, the entire contents of which are incorporated herein by reference.

TECHNICAL FIELD

The present invention relates to quantum cryptography. Specifically, the invention relates to a system and method for quantum key distribution with entangled photon pairs providing efficient quantum key growing.

BACKGROUND

Cryptography is a technique for secure communication between two parties providing protocols that prevent third parties such as adversaries or eavesdropper from reading private information encrypted/decrypted by cryptographic keys. Modern cryptography lies behind mathematical theories and computer science wherein cryptographic algorithms such as integer factorization, discrete logarithm or elliptic-curve discrete logarithm are mainly relied on computational hardness assumptions that the encryption cannot be broke efficiently in practice. However, quantum computers which are able to run a cryptanalysis algorithm such as Shor's algorithm significantly faster than conventional computer may let down the reliance of computational hardness. In current computing technology, small-scale quantum computers have been successfully built which is a good sign for building a one having large qubit capacity which may affectively break the encryption and access to contents of encrypted information. This situation will endanger all cryptographic application in use today such as e-commerce and many other digital applications. Thus, a new cryptography technique called quantum cryptography exploiting quantum mechanical properties of the matter to perform cryptographic tasks has been developed.

Quantum cryptography provides the receiver and the sender to detect existence of an eavesdropper. A well-known example of the quantum cryptography is quantum key distribution. In the state of the art, there are many protocols exploiting different aspects of quantum mechanics for secure cryptographic keys exchange. BB84 protocol mainly uses Heisenberg's Uncertainty Principle and no-cloning theorem wherein random encryption keys are distributed by polarization states of single photons. And specifically, Ekert91 protocol mainly uses non-local correlations between entangled photon pairs.

In the state of the art, a modified Ekert91 protocol setup is disclosed in "Alexander Ling, Matthew P. Peloso, Ivan Marcikic, Valerio Scarani, Antia Lamas-Linares, Christian Kurtsiefer, 'Experimental quantum key distribution based on a Bell test', Physical Review A, 2008." In this setup, the entangled photons are directed to a receiver side and a sender side. For polarizing photons in different polarization orientations and determining probability ratios of the polarized photons, the sender and the receiver includes beam splitters, wave plates, polarizing beam splitters and sensors, and the receiver includes beam splitters, polarizing beam splitters and four sensors. In this setup, photon budget is allocated among three groups such as quantification of security (50%) (the degree of Bell's inequality/of Clauser-Horne-Shimony-Holt (CHSH) violation), forming of raw key (25%) and unavoidable waste (25%) (unused photons)

In the state of the art, quantum key distribution systems and/or methods have a few problems. One major problem arises from that the different applications may require different allocations for quantification of security and forming of the raw key which needs setting up different systems. Moreover, since systems include lots of component, they are heavy, bulky and expensive. Another important problem is arising from the significant amount of waste photons, which limits the final key rate.

Thus, there is still a need in the art for a system and method for entangled photon-based quantum key distribution wherein photons used for quantification of security and forming of the raw key can be reallocated and wasted photons' information may be recycled.

SUMMARY

The present invention provides a novel method for entanglement-based quantum key distribution (QKD).

In an aspect is provided a system for quantum key distribution including a photon source configured to generate an entangled photon pair including a first photon and a second photon and two receiving units configured to receive separately the first photon and the second photon; wherein each of the two receiving units includes: an optoelectronic polarization rotator configured to polarize a photon in a selected polarization orientation; a polarizing beam splitter configured to reflect and transmit polarized particles; at least two photon detectors configured to detect a photon output from the polarizing beam splitter and to determine coincidence particles in a predetermined time interval between the receiving units; a coincidence analyzer, configured to collect and record coincidences; and a quantum random number generator configured to provide a quantum number and to choose OPR polarization angles; wherein three types of coincidences are measured by the coincidence analyzer which is a raw key coincidence, a security check coincidence, and an unused (discarded) coincidence; and the quantum random number generator is configured to regain the unused coincidence to the system as random bits.

In another aspect is provided a method for quantum key distribution including generating: an entangled photon pair by a photon source; transmitting each of the entangled photon pair into different receiving units, polarizing a photon in a selected polarization orientation by a polarization rotator, reflecting or transmitting a polarized photon according to its polarization orientation by a polarizing beam splitter, detecting a transmitted particle by a first particle detector and a reflected particle by a second particle detector; determining each coincided particle in a predetermined time interval between the different receiving units, wherein each of coincidence analyzers at both of the different receiving units are coupled with a communication channel; collecting/recording coincidences seen in two receiver sides by each of the coincidence analyzers; and feeding QRNG to choose an OPR polarization with unused coincidences.

BRIEF DESCRIPTION OF THE DRAWINGS

The FIGURE shows a quantum key distribution system.

DETAILED DESCRIPTION OF THE EMBODIMENTS

The FIGURE shows a quantum key distribution system (100) in accordance with an embodiment of the invention that uses entangled states. As shown, system (100) includes a photon source (110) configured to generate entangled photon pairs and transmit photon pairs branched into the different receiving units (101, 102) Accordingly, photon source (110) of the present invention generates pulse of light including at least one photon pair and each photon pair includes first and second photon.

In the present invention, photon source (110) may include;
- a laser diode configured to emit a diverging beam of photons,
- an aspheric lens configured to collimate the diverging beam,
- at least one mirror configured to redirect the beam with fine alignment,
- an aspheric lens configured to focus and to couple the beam into a single-mode fiber for spatial filtering,
- a single-mode fiber,
- at least one dichroic mirror configured to filter the wavelengths, and
- a Glan-Taylor polarizer configured to linearly polarize the beam, and
- at least one BBO crystal configured to generate entangled photons.

According to the present invention, there are four steps in the generation of entangled states of photon: spatial filtering, wavelength filtering, polarizing of photons and generation of entanglement. Photon pair passes through the polarizer directing each photon to one of the receiving unit paths through the optical quantum channels. Due to the quantum nature of entangled photons, a measurement of one of the photon pairs in first receiving unit will influence the quantum state of the other of the same photon pair in second receiving unit Each receiving unit (101, 102) also includes an optoelectronic polarization rotator (121, 122) configured to polarize the photon in selected polarization orientation. Said polarization rotator rotates the polarization of photon by certain degrees in the optical path and a polarized photon is obtained. Each receiving unit sets two angles at their respective polarization rotator randomly or selectively. Thus, optoelectronic polarization rotator can be used randomly or selectively.

In the present invention, when receiving units randomly set angles, quantum random number generators can be used.

According to the invention, optoelectronic polarization rotators (121, 122) send the photon particle to polarizing beam splitter (PBS) (131, 132) configured to reflecting or transmitting the polarized particles, wherein the photon particle is projected into either s-polarization or p-polarization which means respectively reflection or transmission. Beam splitters of the present invention are preferably fused silica fiber beam splitters.

Each receiving unit includes at least two photon detectors (141, 142, 143, 144) for detecting the photon output from the polarizing beam splitter (131, 132) Each polarized particle/photon passing through PBS is directed to one detector without being split into two photons. The present invention does not perform a down conversion process. Detectors detect the photon in one path or the other. The probability about the path of photon is p for the first path and 1-p for the second path. Thus, said photon detectors are configured to determine whether the particle is in s-polarization or p-polarization and to perform quantum key distribution according to the detection results such as a detection time, a base information and a bit value.

Detection time of photons, base information or OPR's polarization angle seen in OPRs and bit value are important parameters, especially detection time of photons. According to the present invention, each receiving units measure detection time of photons and analyze two detection times as to whether they are in a predetermined coincidence time interval. As used herein, coincidence time interval (i.e coincidence window) is defined as the duration that starts when one detector is clicked in the first receiving unit and finishes when one detector is clicked in the second receiving unit. The determination of coincidence time interval depends on the distribution speed of photon.

According to the measurement in coincidence, a pair-coherence time of the two photons created in down-conversion is extremely short. For example; $\tau_{pair} \sim 100 \times 10^{-15}$ seconds. Accordingly, if one of two photons are detected, the other one is also detected within this short interval of time. In the experiments, it is clearly seen that this interval can be completely negligible and that two photons arrive at the same time to the detectors.

Thereby, each receiving unit includes its own detection time of photon. If two detection times are not in a predetermined time interval, it means that two photons are not entangled and that two photons are not counted as coincidence. But, if two detection times measured in each receiving unit are in predetermined time interval, then two photons are entangled and are counted as coincidence.

In addition, bit value is important in tracking of the detector which is clicked. Because the combination of the detector which is clicked and the optical axis (OA) of the OPR is important in the operation of QRNG.

Photon detectors are preferably single photon detectors operating in Geiger mode and each detector may include a photodiode sensitive to the photons of the frequencies used in respective receiving unit.

The measurement from the detectors is for generating raw key by processing detection results according to corresponding quantum key distribution protocol. Depending on the configuration of the OPR (121, 122), the detector (141, 143) on the path of photon particle with s-polarization state (transmitted particle) detects the photon or in other configuration of OPR (121, 122), the detector (142, 144) on the path of photon particle with p-polarization state (reflected particle) which are transmitted particles detects the photon.

Single photon detectors (141, 142, 143, 144) produce photon detection results to be collected and/or recorded by coincidence analyzer (151, 152) The outputs from the detectors are applied to said coincidence analyzer. Coincidences collected by coincidence analyzer divides photon detection results into three group of coincidence: 1) coincidences to be used as raw key, 2) coincidences to be used as a security check, which guarantees the randomness and the security of the bits created, by violation of Bell's inequality (or its variations) and 3) unused coincidences. In the present method, discarded bits corresponding to these bases' configurations are used, as long as the Bell's inequality is violated, as random numbers which correspond to certain voltage or current values resulting in the certain polarization angles and fed into OPR for changing the choice of basis set which is represented by OPR's polarization angle. In this way, the wasted photons of the discarded (unused) coincidences are regained to the circuitry and absolute amount of waste is eliminated. With this technique, the number of detectors used in each side can be restricted to two, while in previously established entanglement-based protocols required more detectors. The invention also provides flexible adjustment for the percentage use of photons for key generation to Bell's inequality violation (security check) ratio which is ratio of bits used for security check to the bits used as raw key. This effectively maximizes the key length without compromising the security.

As used herein, coincidence is determined between two receiving units by using detection data shared through a communication, probably communications found in the prior art Thus, coincidence analyzers of both receiving units are connected by a communication channel.

According to the present invention, photons are transmitted in the system through a quantum channel which may be optical waveguides, optical fibers, free spaces, fiber optical elements, planar waveguide optical elements or any combination thereof.

The quantum key distribution protocol is carried out between two receiving units by a communication channel connecting them.

The quantum key distribution system of the present invention further includes a Quantum Random Number Generators (QRNG) (161, 162) configured to give randomly selected voltage to OPRs therefore choosing the OPR's polarization angles according to the voltage. Base information seen in OPRs is also important for the operation of Quantum Random Number Generator (QRNGs) Optical axis (OA) of OPRs must be kept track for the operation of QRNGs. Base information and optical axis of OPR have an important relation. OA of an OPR is one of the bases of a basis set. For example, 0°-90° form a basis set and the OA of an OPR can be either 0° or 90°

According to the present invention, QRNG (162) of the first receiving unit (102) gives three outputs representing the orientation of the optical axis of OPR (122) and PBS (132) of the same receiving unit. The optical axis of OPR (122) and PBS (132) must be same and can be selected from 90°, 67.5° and 22.5°. However, QRNG (161) of the second receiving unit (101) gives two outputs representing the orientation of the optical axis of OPR (121) and PBS (131). The optical axis of OPR (121) and PBS (131) must be same and can be selected from 90° or 45°. These optical axis of OPR are combined with data from the detector, which is clicked, and this combination creates a unique identity (ID). Each unique ID is assigned a voltage value and this voltage value is applied to the OPR. This combination represents a unique input to QRNG. Unique input matches with certain outputs of OPR. The outputs are the voltage value that is supplied to OPR. A QRNG that works independently of the optical axis of OPR and the clicking detector pair can also be used. According to the present invention, QRNG is dependent or independent to the detector which would be clicked or the optical axis of OPR. In other words, independent QRNG is the generator which does not need any input in order to function of QRNG; whereas inputs should be given to dependent QRNG for its function.

Accordingly, the present invention provides a system for quantum key distribution including a photon source (110) configured to generate entangled photon pair including first and second photon and two receiving units configured to receive separately first and second photon; wherein each receiving units include,
an optoelectronic polarization rotator (121; 122) configured to polarize the photon in selected polarization orientation;
a polarizing beam splitter (131; 132) configured to reflecting or transmitting the polarized particles;
at least two photon detectors (141, 142; 143, 144) configured to detect the photon output from the polarizing beam splitter and to determine coincidence particles in the predetermined time interval between the receiving units;
a coincidence analyzer (151, 152), configured to collect and record the coincidences; and
a quantum random number generator (161; 162) configured to provide quantum number and to choose the OPR polarization angles.

The present invention provides also a method for quantum key distribution including the steps of;
generating entangled photon pair by a photon source (110);
transmitting each of entangled photon pair into the different receiving units (101, 102);
polarizing the photon in selected polarization orientation by a polarization rotator (121, 122);
reflecting or transmitting the polarized photon according to its polarization orientation by a polarizing beam splitter (131, 132);
detecting transmitted particle by a first particle detector (141, 143) and reflected particle by a second particle detector (142, 144);
determining each coincided particle in the predetermined time interval between the receiving units wherein the coincidence analyzers at both receiving units are coupled with a communication channel;
collecting the coincidences between the receiving units by coincidence analyzer (151, 152);
feeding QRNG to choose the OPR polarization with coincidences, preferably unused coincidence.

The invention claimed is:

1. A system for a quantum key distribution comprising a photon source configured to generate an entangled photon pair comprising a first photon and a second photon and two receiving units configured to receive separately the first photon and the second photon; wherein each of the two receiving units comprises:
an optoelectronic polarization rotator (OPR) configured to polarize a photon in a selected polarization orientation;
a polarizing beam splitter configured to reflect and transmit polarized particles;
at least two photon detectors configured to detect a photon output from the polarizing beam splitter and to determine coincidence particles in a predetermined time interval between the two receiving units; a coincidence analyzer configured to collect and record coincidences; and
a quantum random number generator configured to provide a quantum number and to choose OPR polarization angles;
wherein three types of the coincidences are measured by the coincidence analyzer, wherein the three types of the coincidences are a raw key coincidence, a security check coincidence, and an unused, discarded coincidence; and wherein the quantum random number generator is configured to regain the unused, discarded coincidence to the system by providing random bits denoted by the unused, discarded coincidence as the quantum number for choosing said OPR polarization angles.

2. The system according to claim 1, wherein each of the two receiving units is configured to set two angles at a respective optoelectronic polarization rotator randomly or selectively.

3. The system according to claim 2, wherein each of the two receiving units is configured to measure a detection time of the first photon or a detection time of the second photon and analyze the detection time of the first photon and the detection time of the second photon as to whether the detection time of the first photon and the detection time of the second photon are in a predetermined coincidence time interval.

4. The system according to claim 1, wherein each of the two receiving units is configured to measure a detection time of the first photon or a detection time of the second photon and analyze the detection time of the first photon and the detection time of the second photon as to whether the detection time of the first photon and the detection time of the second photon are in a predetermined coincidence time interval.

5. A method for a quantum key distribution comprising:
   generating an entangled photon pair by a photon source;
   transmitting the entangled photon pair into different receiving units,
   polarizing a photon in a selected polarization orientation by a polarization rotator,
   reflecting or transmitting a polarized photon according to the selected polarization orientation by a polarizing beam splitter,
   detecting a transmitted particle by a first particle detector and a reflected particle by a second particle detector;
   determining each coincided particle in a predetermined time interval between the different receiving units, wherein each of coincidence analyzers at both of the different receiving units are coupled with a communication channel;
   collecting/recording coincidences seen in two receiver sides by each of the coincidence analyzers, wherein the coincidences include three types of the coincidences denoted by the coincidence analyzers, wherein the three types of the coincidences are a raw key coincidence, a security check coincidence, and an unused, discarded coincidence; and
   feeding random bits denoted by the unused, discarded coincidence to a quantum random number generator (QRNG) to choose an optoelectronic polarization rotator (OPR) polarization with the random bits.

* * * * *